(12) United States Patent
Ikeji et al.

(10) Patent No.: US 8,773,819 B2
(45) Date of Patent: Jul. 8, 2014

(54) ACTUATOR MOUNTING SECTION OF DISK DRIVE SUSPENSION, METHOD OF APPLYING ELECTRICALLY CONDUCTIVE PASTE, AND PASTE APPLICATION DEVICE

(71) Applicant: NHK Spring Co., Ltd., Yokohama (JP)

(72) Inventors: Yoichi Ikeji, Yokohama (JP); Haruyuki Yamamoto, Yokohama (JP); Tsuyoshi Amemiya, Yokohama (JP); Hiroshi Ono, Yokohama (JP)

(73) Assignee: NHK Spring Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 13/870,937

(22) Filed: Apr. 25, 2013

(65) Prior Publication Data

US 2013/0321958 A1 Dec. 5, 2013

(30) Foreign Application Priority Data

May 30, 2012 (JP) .................................. 2012-123003

(51) Int. Cl.
*G11B 21/10* (2006.01)

(52) U.S. Cl.
USPC ..................................................... 360/245.8

(58) Field of Classification Search
USPC ..................................................... 360/245.8
See application file for complete search history.

(56) References Cited

U.S. PATENT DOCUMENTS

| | | | |
|---|---|---|---|
| 6,731,472 B2 | 5/2004 | Okamoto et al. | |
| 8,248,734 B2 * | 8/2012 | Fuchino | 360/294.4 |
| 8,339,743 B2 * | 12/2012 | Miura et al. | 360/244.3 |
| 8,351,160 B2 * | 1/2013 | Fujimoto | 360/245.8 |
| 8,405,934 B2 | 3/2013 | Fuchino | |
| 8,416,536 B2 * | 4/2013 | Fuchino et al. | 360/294.4 |
| 8,582,245 B2 * | 11/2013 | Hanya et al. | 360/245.9 |

FOREIGN PATENT DOCUMENTS

| | | |
|---|---|---|
| JP | 2002-50140 | 2/2002 |
| JP | 2011-216160 | 10/2011 |

* cited by examiner

*Primary Examiner* — Mark Blouin
(74) *Attorney, Agent, or Firm* — Holtz Holtz Goodman & Chick PC

(57) ABSTRACT

Actuator elements are accommodated in openings formed in a conductive plate. These actuator elements are secured to the conductive plate by a resin bonding material. An electrode of each actuator element and the conductive plate are electrically connected to each other by a bridge junction consisting of an conductive paste. A paste application device discharges the conductive paste toward the bridge junction by air. A control unit configured to control the discharge of the conductive paste sets the air pressure according to the elapsed time of use of the conductive paste so that the height of the paste above the resin bonding material is not less than a target height. The target height is maintained by increasing the air pressure with increase of the elapsed time of use of the conductive paste.

4 Claims, 7 Drawing Sheets

ACTUATOR MOUNTING SECTION OF DISK DRIVE SUSPENSION, METHOD OF APPLYING ELECTRICALLY CONDUCTIVE PASTE, AND PASTE APPLICATION DEVICE

CROSS-REFERENCE TO RELATED APPLICATIONS

This application is based upon and claims the benefit of priority from prior Japanese Patent Application No. 2012-123003, filed May 30, 2012, the entire contents of which are incorporated herein by reference.

BACKGROUND OF THE INVENTION

1. Field of the Invention

This invention relates to an actuator mounting section of a disk drive suspension comprising an actuator element of, for example, lead zirconate titanate (PZT), a method of applying an electrically conductive paste, and a paste application device.

2. Description of the Related Art

A hard disk drive (HDD) is used in an information processing apparatus, such as a personal computer. The HDD comprises a magnetic disk rotatable about a spindle, a carriage turnable about a pivot, etc. The carriage, which comprises an actuator arm, is configured to be turned transversely relative to tracks about the pivot by a positioning motor, such as a voice coil motor.

A suspension is mounted on the actuator arm. The suspension comprises a load beam and flexure superposed thereon. A slider, which constitutes a magnetic head, is mounted on a gimbal portion formed near the distal end of the flexure. The slider is provided with elements (transducers) for accessing data, that is, for reading or writing.

In order to overcome the increase in the recording density of disks, the magnetic head should be more precisely positioned relative to the recording surface of each disk. To attain this, dual-stage actuator (DSA) suspensions have been developed as disclosed in Jpn. Pat. Appln. KOKAI Publications Nos. 2002-50140 (Patent Document 1) and 2011-216160 (Patent Document 2). Each DSA suspension comprises a positioning motor (voice coil motor) and actuator element made of a piezoelectric material, such as lead zirconate titanate (PZT).

The distal end of the suspension can be moved at high speed by an infinitesimal distance in a sway direction (or transversely relative to tracks) by applying a voltage to and thereby deforming the actuator element. This actuator element is disposed on an actuator mounting section on the suspension.

The piezoelectric material is in the form of a plate, and one electrode is provided on one thicknesswise surface thereof, and the other electrode on the other surface. The one electrode is electrically connected to an electrically conductive plate on the ground side through a bridge junction of an electrically conductive paste, such as silver paste. The other electrode is connected to a conducting member of the flexure by an electrically conductive member, such as a bonding wire. In some cases, as disclosed in Patent Document 2, a terminal area of a conducting member may be connected to an electrode of an actuator element through an electrically conductive bonding material.

As described above, the one electrode of the electrically conductive actuator is electrically connected to the electrically conductive plate of the actuator mounting section by the bridge junction of an electrically conductive pas such as silver paste. The electrical resistance of the bridge junction can be reduced by increasing the conductive paste used. Since the conductive paste based on silver paste or the like is more expensive than a conventional resin bonding material, however, the greater the amount conductive paste used in the bridge junction, the higher the cost of the actuator mounting section is.

The electrically conductive paste is applied to the bridge junction by means of a dispenser. The use of the conductive paste can be managed by, for example, controlling the dispenser so that the delivery of the paste is constant or processing an image so that a coated area is fixed. However, some continuity tests revealed that the electrical resistance may exceed its tolerance, depending on the form of the conductive paste applied to the bridge junction, if the delivery or coated area is controlled to minimize the use of the conductive paste. For example, an electrically insulating resin bonding material for securing the actuator element to the electrically conductive plate exists between the electrode and conductive plate. The wettability of the conductive paste to the resin bonding material, is so low that shrinkage of the conductive paste occurs on the bonding material if the conductive paste is applied thinly to the bridge junction. If such shrinkage occurs, the conductive paste becomes so narrow that the electrical resistance inevitably exceeds the tolerance.

BRIEF SUMMARY OF THE INVENTION

Accordingly, the object of this invention is to provide an actuator mounting section of a disk drive suspension, a method of applying an electrically conductive paste, and a paste application device, capable of reliably achieving electrical conduction of a bridge junction between an actuator element and electrically conductive plate while suppressing the use of the conductive paste.

An actuator mounting section according to one embodiment comprises an actuator element comprising an electrode, an electrically conductive plate comprising an opening which accommodates the actuator element, an electrically insulating resin bonding material which secures the actuator element to the electrically conductive plate, and an electrically conductive paste applied to a bridge junction configured to electrically connect the electrically conductive plate and the electrode. The electrically conductive paste of the bridge junction comprises a first portion, second portion, and third portion. The first portion is formed on the resin bonding material between the electrode and the electrically conductive plate and has a paste height above the resin bonding material smaller than either of those above the electrically conductive plate and the electrode. The second portion is formed on the electrically conductive plate and has a paste width on the electrically conductive plate greater than that of the first portion. The third portion is formed on the electrode and has a paste width on the electrode greater than that of the first portion. An example of the actuator element is made of a piezoelectric material, such as PZT. An example of the conductive paste comprises an organic resin binder and silver particles as electrically conductive particles mixed in the binder. The viscosity of the binder increases with increase of an elapsed time of use.

One of reasons why the viscosity of the electrically conductive paste increases with increase of the elapsed time of use is that the paste is gradually cured by a chemical reaction caused even by the heat of room temperature if it uses, for example, a thermosetting binder (bonding material). The reaction is suppressed if a specified freezing temperature for keeping is minus 40° C. At temperatures other than the specified temperature, however, the reaction progresses to some degree. In the case of an electrically conductive paste using an ultraviolet-curable binder, its curing may gradually progress under the influence of, for example, an ultraviolet (UV) component contained in fluorescent light.

In one embodiment of a method of applying an electrically conductive paste, a pressure of air is set according to an elapsed time of use of an electrically conductive paste so that a paste height above a resin bonding material between an electrode and an electrically conductive plate is not less than a target height, and the electrically conductive paste is discharged from a dispenser toward a bridge junction by means of the air pressure. Further, the target height of the electrically conductive paste is maintained by increasing the air pressure with increase of the elapsed time of use.

A control unit of a paste application device comprises means for obtaining information corresponding to an elapsed time of use of an electrically conductive paste in a dispenser and means for setting the air pressure according to the elapsed time of use so that a paste height above a resin bonding material between an electrode and an electrically conductive plate is not less than a target height, discharging the electrically conductive paste from the dispenser toward a bridge junction by means of the air pressure, and maintaining the target height of the electrically conductive paste by increasing the air pressure with increase of the elapsed time of use.

In the actuator mounting section of the disk drive suspension, according to these embodiments, the use of the electrically conductive paste at the bridge junction that electrically connects the electrode of the actuator element and the electrically conductive plate can be suppressed, and electrical conduction of the bridge junction can be achieved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A disk drive suspension which comprises an actuator mounting section according to a first embodiment of the present invention will now be described with reference to FIGS. 1 to 9.

Figure 1:
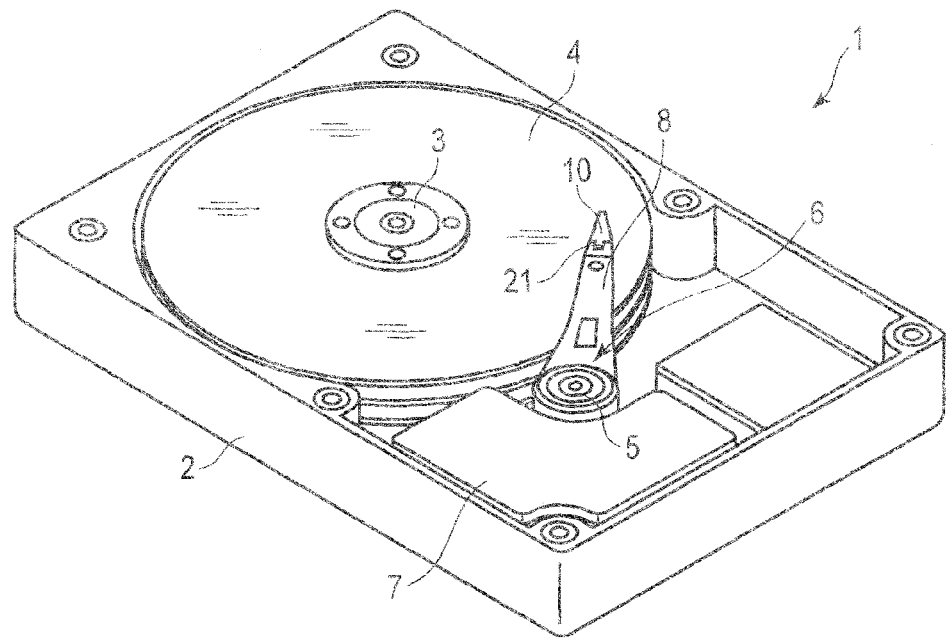
FIG. 1 is a perspective view showing an example of a disk drive.

A disk drive (HDD) 1 shown in FIG. 1 comprises a case 2, disks 4 rotatable about a spindle 3, carriage 6 turnable about a pivot 5, positioning motor (voice coil motor) for actuating the carriage 6, etc. The case 2 is sealed by a lid (not shown).

Figure 2:
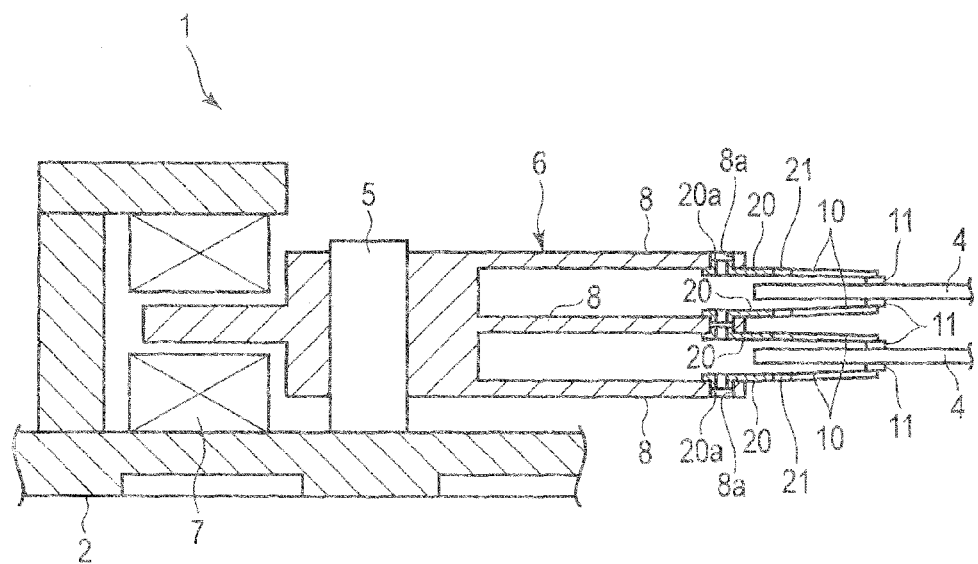
FIG. 2 is a sectional view of a part of the disk drive shown in FIG. 1.

FIG. 2 is a sectional view schematically showing a part of the disk drive 1. As shown in FIGS. 1 and 2, the carriage 6 comprises arms (carriage arms) 8. A suspension 10 is mounted on the distal end portion of each arm 8. A slider 11, which constitutes a magnetic head, is provided on the distal end portion of the suspension 10. If each disk 4 rotates at high speed, an air bearing is formed between the disk and the slider 11. If the carriage 6 is turned by the positioning motor 7, the suspension 10 moves radially relative to the disk 4, whereupon the slider 11 moves to a desired track of the disk 4.

Figure 3:
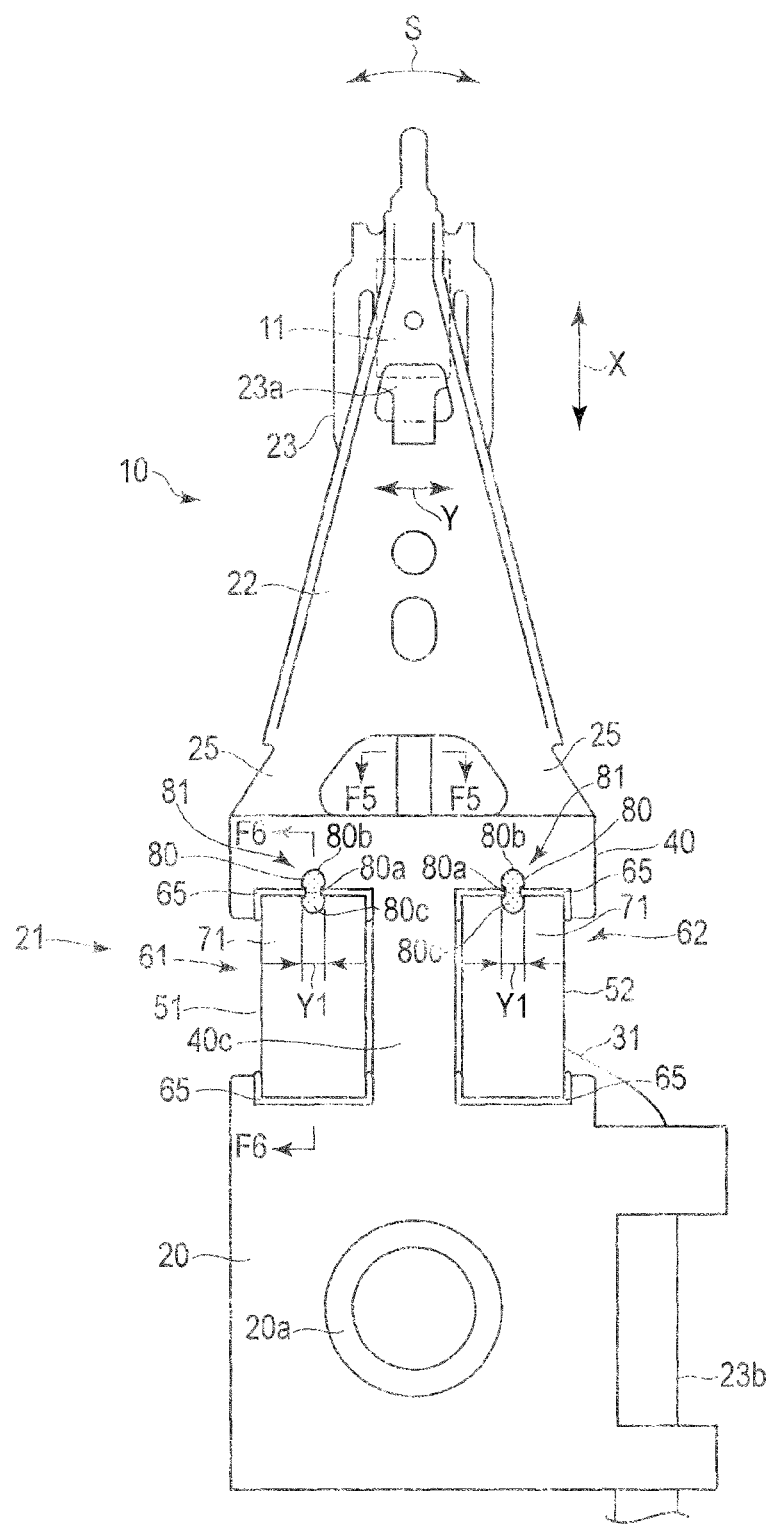
FIG. 3 is a plan view of a disk drive suspension with an actuator mounting section according to a first embodiment.
Figure 4:
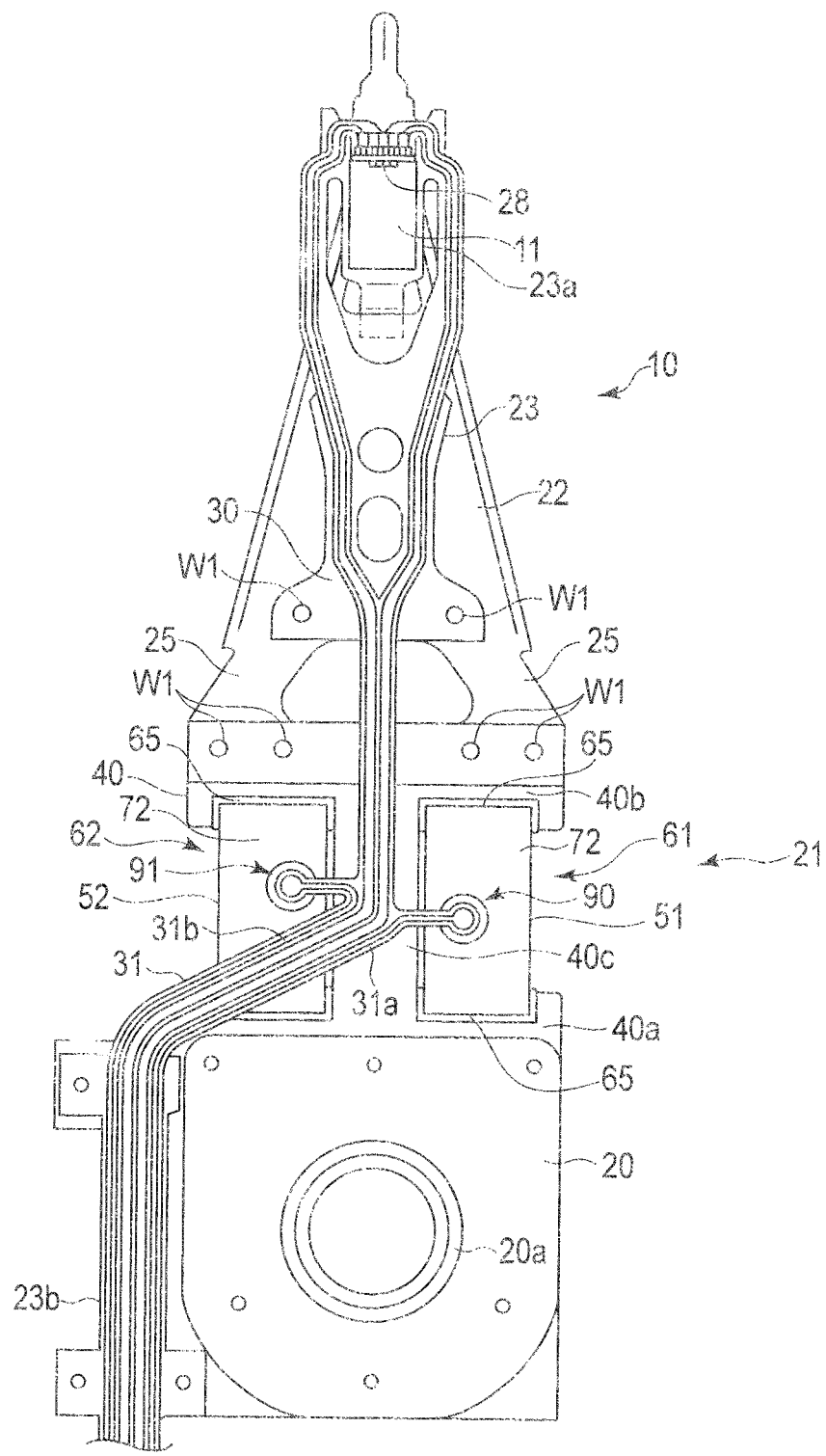
FIG. 4 is a view of the disk drive suspension of FIG. 3 taken from the opposite side.

FIG. 3 is a plan view of the suspension 10 of the dual-stage actuator (DSA) type. FIG. 4 is a view of the suspension 10 taken from the opposite side. This suspension 10 comprises a base section 20, actuator mounting section 21, load beam 22, flexure 23 with conductors, etc. The base section 20 is secured to its corresponding arm 8 (FIGS. 1 and 2) of the carriage 6. A boss portion 20a to be inserted into a hole 8a (FIG. 2) in each arm 8 is formed on the base section 20.

In FIG. 3, arrow X indicates the longitudinal direction of the load beam 22, that is, the longitudinal direction (front-rear direction) of the suspension 10; arrow Y, the transverse direction; and arrow S, a sway direction. Hinge portions 25 are formed on the proximal portion (rear end portion) of the load beam 22. The hinge portions 25 can be springy deformed thicknesswise. The actuator mounting section 21 is provided between the base section 20 and load beam 22. The mounting section 21 has the function of moving the load beam 22 in the sway direction (indicated by arrow S).

As shown in FIG. 4, the flexure 23 is disposed along the load beam 22. A tongue 23a that functions as a gimbal portion is formed near the distal end of the load beam 22, that is, near that of the flexure 23. The slider 11, which serves as the magnetic head, is mounted on the tongue 23a.

Elements 28 (FIG. 4) such as magnetoresistive elements (MR elements), for example, capable of conversion between magnetic and electrical signals are arranged on an end portion of the slider 11. These elements 28 are used for accessing data on the disks 4, that is, for writing or reading. The slider 11, load beam 22, flexure 23, etc., constitute a head gimbal assembly. A rear portion 23b of the flexure 23 extends rearward from the base section 20.

Figure 5:
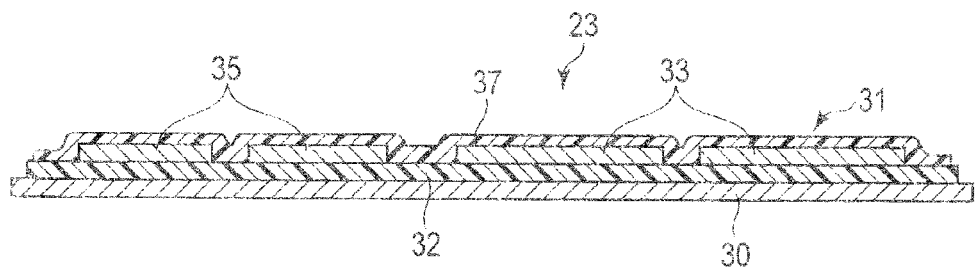
FIG. 5 is a partial sectional view of a flexure taken along line F5-F5 of FIG. 3.

FIG. 5 shows an example of a transverse cross-section of the flexure 23. The flexure 23 comprises a metal base 30 and conducting member 31. The metal base 30 is made of, for example, stainless steel. The conducting member 31 is formed on the metal base 30. The conducting member 31 comprises an insulating layer 32, write conductors 33, read conductors 35, cover layer 37, etc. The insulating layer 32 is made of an electrically insulating material, such as polyimide. The conductors 33 and 35 are formed on the insulating layer 32. The cover layer 37 is made of an electrically insulating material, such as polyimide. The write and read conductors 33 and 35 are connected to the elements 28 on the slider 11. The metal plate 30 of the flexure 23 is secured to the load beam 22 by welds W1 (some of which are shown in FIG. 4), such as laser spot welds.

Figure 6:
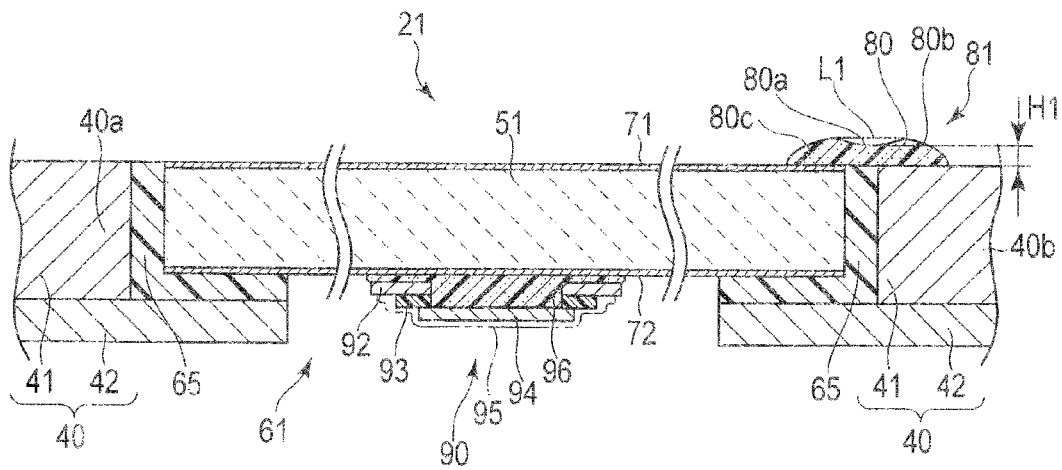
FIG. 6 is a sectional view of the actuator mounting section taken along line F6-F6 of FIG. 3.

FIG. 6 is a sectional view of the actuator mounting section 21 taken along line F6-F6 of FIG. 3. The actuator mounting section 21 comprises an electrically conductive plate 40 and a pair of actuator elements 51 and 52 (FIGS. 3, 4 and 6). The conductive plate 40 is formed by superposing first and second plate elements 41 and 42 thicknesswise. Actuator elements 51 and 52 are made of a piezoelectric material, such as PZT. A part (rear part) of the conductive plate 40 constitutes the base section 20.

The electrically conductive plate 40 comprises a stationary part 40a (FIG. 4), movable part 40b, and part 40c connecting parts 40a and 40b. The stationary and movable parts 40a and 40b adjoin the base section 20 and hinge portions 25, respectively. The stationary part 40a is a part that is substantially immovable relative to the base section 20. The movable part 40b is a part that can be moved in the sway direction by actuator elements 51 and 52.

The electrically conductive plate 40 is formed with openings 61 and 62 capable of accommodating actuator elements 51 and 52, respectively. Actuator elements 51 and 52 are accommodated in openings 61 and 62, respectively. Actuator elements 51 and 52 are secured to the conductive plate 40 by an electrically insulating resin bonding material 65 such as an epoxy resin, for example. This resin bonding material 65 is provided between the electrically conductive plate 40 and actuator elements 51 and 52.

FIG. 6 representatively shows the one actuator element 51. A first electrode 71 is provided on one thicknesswise surface of actuator element 51. A second electrode 72 is provided on the other surface of actuator element 51. These electrodes 71 and 72 are formed on the surfaces of the PZT by sputtering or plating and form flat electrode surfaces. The other actuator element 52 is constructed in the same manner as actuator element 51.

The first electrode 71 of the one actuator element 51 is electrically connected to the electrically conductive plate 40 as a ground side by an electrically conductive paste 80 (FIGS. 3 and 6), such as silver paste. The first electrode 71 of the other actuator element 52 is also electrically connected to the electrically conductive plate 40 by an electrically conductive paste 80. Each of these conductive pastes 80 forms a bridge junction 81. The bridge junction 81 electrically connects the electrode 71 of its corresponding actuator element 51 or 52 and the conductive plate 40.

The electrically conductive paste 80 used for the bridge junction 81 comprises an organic resin binder and silver particles as electrically conductive particles. The binder consists mainly of, for example, an epoxy resin. The silver particles are mixed in the binder. While an example of the binder is thermosetting bonding material, it may alternatively be of an ultraviolet-curable type. The conductive paste 80 is heated at a low temperature of, for example, 180° C. or less. Thus, the binder is cured and the silver particles contact one another, so that the conductive paste 80 can achieve electrical conduction.

The heating temperature of the electrically conductive paste 80 is not higher than the heat-resistant temperatures of the regin portion, for example, the insulating layer 32 and cover layer 37. A piezoelectric material, such as PZT, may be used for actuator elements 51 and 52. Preferably, in this case, the heating temperature of the conductive paste 80 should be half or less of the Curie point (° C.) at which the degree of polarization of the piezoelectric material is suddenly reduced.

As shown in FIGS. 3 and 6, the electrically conductive paste 80 of the bridge junction 81 comprises first, second and third portions 80a, 80b and 80c. The first portion 80a is bonded to the resin bonding material 65 upon the bonding material 65. The second portion 80b is bonded to the electrically conductive plate 40 upon the conductive plate 40. The third portion 80c is bonded to the electrode 71 (or 72) upon the electrode 71 (or 72). The paste height H1 (FIG. 6) of the first portion 80a is less than either of those of the second portion 80b on the conductive plate 40 and the third portion 80c. Further, the paste width Y1 (FIG. 3) of each of the second and third portions 80b and 80c is greater than that of the first portion 80a. The use of the conductive paste 80 shaped in this way was able to be minimized while maintaining the electrical conductivity of the bridge junction 81 by making the paste height H1 of the first portion 80a of the conductive paste 80 not less than the target height H2, which will be described later.

The second electrodes 72 (FIG. 6) of actuator elements 51 and 52 are connected to conductors 31a and 31b (FIG. 4) of the conducting member 31 through terminal areas 90 and 91, respectively. These terminal areas 90 and 91 have a common configuration. FIG. 6 shows the one terminal area 90. The terminal area 90 comprises a metal base 92, electrically insulating layer 93, and conductor layer 94. The insulating layer 93 is formed on the metal base 92, and the conductor layer 94 on the insulating layer 93. The conductor layer 94 is covered by a cover member 95. The terminal area 90 is secured to the second electrode 72 of actuator element 51 by an electrically conductive bonding material 96, such as silver paste. The other terminal area 91, like the terminal area 90, is secured to the second electrode 72 of actuator element 52 by an electrically conductive bonding material 96.

Figure 7:
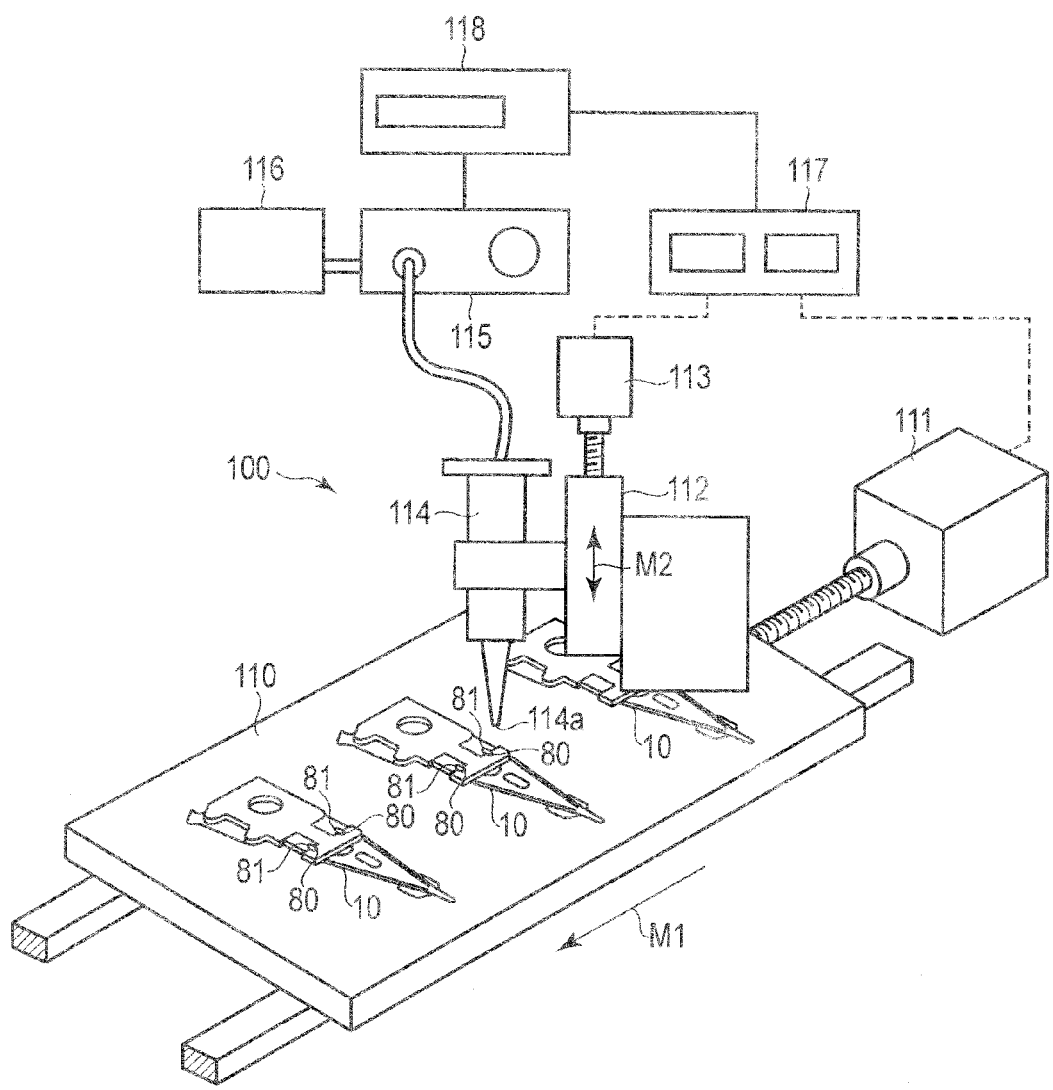
FIG. 7 is a perspective view schematically showing a paste application device.

The electrically conductive paste 80 that constitutes the bridge junction 81 is applied by means of a paste application device 100 schematically shown in FIG. 7. The following is a description of the paste application device 100.

The paste application device 100 shown in FIG. 7 comprises a movable stage 110, drive mechanism 111, lifting stage 112, lift mechanism 113, dispenser 115 comprising a syringe 114, air supply source 116, stage controller 117, and control unit 118. The movable stage 110 holds a plurality of suspensions 10 arranged at a predetermined pitch. The drive mechanism 111 moves the movable stage 110 in the direction indicated by arrow M1. The lifting stage 112 is vertically movable. The lift mechanism 113 moves the lifting stage 112 in the direction indicated by arrow M2. The dispenser 115 is attached to the lifting stage 112. The control unit 118 comprises a sequencer or the like for controlling the discharge of the electrically conductive paste 80. The pressure of air delivered from the air supply source 116 to the syringe 114 can be changed by means of a pressure adjustment mechanism (not shown).

Figure 8:
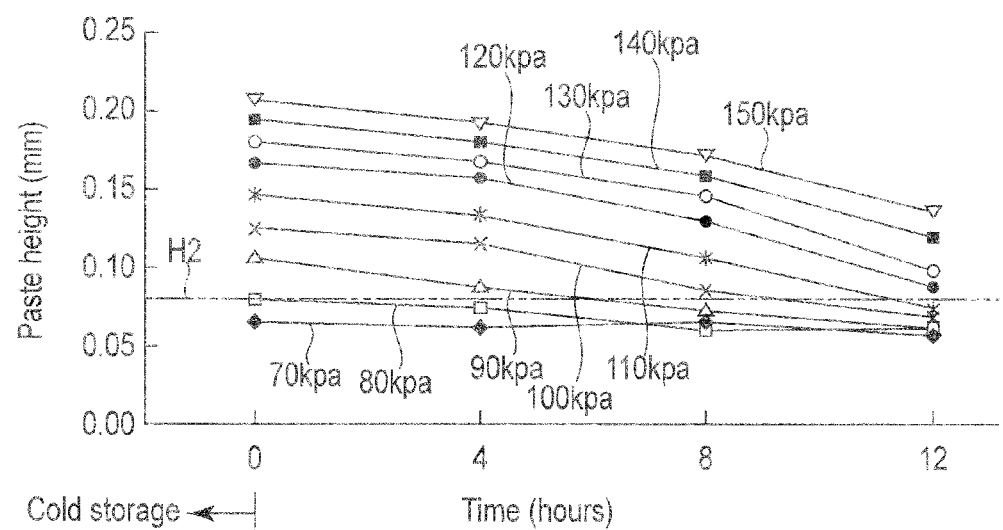
FIG. 8 is a diagram showing the relationship between the elapsed time of use of an electrically conductive paste and paste height.

FIG. 8 shows the relationship between the elapsed time of use (abscissa) of the electrically conductive paste 80 and the paste height H1 (ordinate) of the first portion 80a of the paste 80. Here, the "elapsed time of use of the electrically conductive paste 80" is the time elapsed after the conductive paste 80 having been stored in a freezer is taken out of it and put in the dispenser 115. Line segment H2 shown in FIG. 8 indicates an example of a target height. Since the first portion 80a fully includes the electrically conductive particles (silver particles) with this target height H2, the electrical resistance of the bridge junction 81 has a low practical value.

The control unit 118 of the paste application device 100 of the present embodiment comprises a timer as a means for obtaining data on the elapsed time of use of the electrically conductive paste 80. This timer counts the time after the conductive paste 80 is put in the dispenser 115. For example, the timer counts the time elapsed since the accommodation of the conductive paste 80 in the syringe 114.

The longer the elapsed time of use, as shown in FIG. 8, the smaller height H1 of the electrically conductive paste 80 discharged from the dispenser 115 is. The greater the air pressure, the greater height H1 is. This because the conductive paste 80 has such a chracteristic that the longer the elapsed time of use, the more viscous the binder becomes.

Figure 9:
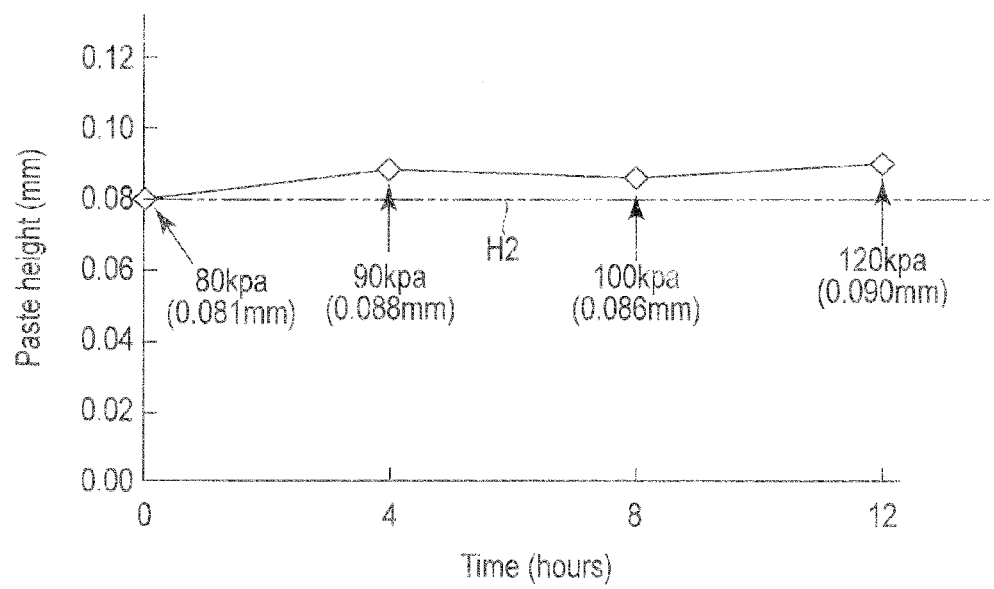
FIG. 9 is a diagram showing the relationship between the elapsed time of use of the conductive paste, air pressure, and paste height.

FIG. 9 shows the relationship between the elapsed time of use of the electrically conductive paste 80, air pressure controlled by the control unit 118, and the paste height H1. The control unit 118 increases the air pressure with increase of the elapsed time of use of the conductive paste 80 so that the target height H2 can be maintained according to the elapsed time of use.

The electrically conductive paste 80 having been stored in the freezer is put in the syringe 114. The conductive paste 80 in the syringe 114 is discharged through a discharge port 114a of the syringe 114 toward the bridge junction 81 by a pressure of air delivered from the air supply source 116. If the delivery of the discharged conductive paste 80 is great, as in the conventional case, the conductive paste 80 swells into a bead, as indicated by two-dot chain line L1 in FIG. 6.

The electrically conductive paste 80 is highly wettable with the metals of the electrically conductive plate 40, electrode 71, etc. However, the conductive paste 80 is not very wettable with the resin bonding material 65. Taking advantage of this difference in wettability, the paste height and width of the first portion 80a on the resin bonding material 65 can be made less than those of each of the second and third portions 80b and 80c. Thus, the first portion 80a is somewhat constricted as the use of the conductive paste 80 is minimized within such a range that the electrical resistance of the bridge junction 81 does not exceed a tolerance.

The dispenser 115 is controlled so that the paste height H1 of the first portion 80a of this shape is not less than the target height H2. Thereupon, the electrical resistance of the bridge junction 81 can be prevented from exceeding the tolerance. Thus, the control unit 118 controls the air pressure so that the paste height H1 of the first portion 80a of the conductive paste 80 is not less than the target height H2.

The control unit 118 sets the air pressure according to the elapsed time of use of the electrically conductive paste 80, and controls the dispenser 115 so that the conductive paste 80 is discharged toward the bridge junction 81 under the set air pressure. As shown in FIG. 9, moreover, the target height H2 is maintained by increasing the air pressure with increase of the elapsed time of use of the electrically conductive paste 80. Specifically, the control unit 118 is incorporated with a computer program for controlling the discharge of the conductive paste 80 according to the elapsed time of use of the conductive paste 80. By means of the paste application device 100 constructed in this manner, the target height H2 of the conductive paste 80 can be maintained so that the electrical resistance of the bridge junction 81 does not exceed the tolerance.

The following is a description of the operation of the suspension 10.

If the carriage 6 (FIGS. 1 and 2) is turned by the positioning motor 7, the suspension 10 moves radially relative to the disk 4. Thereupon, the slider 11 of the magnetic head moves to a desired track of a recording surface of the disk 4. If a voltage is applied to actuator elements 51 and 52, these actuator elements are distorted in opposite directions according to the voltage level. Consequently, the load beam 22 can be finely moved in the sway direction (indicated by arrow S in FIG. 3). As actuator elements 51 and 52 expand and contract, respectively, for example, the load beam 22 moves in the sway direction. Thus, the slider 11 can be positioned quickly and accurately in the sway direction.

Figure 10:
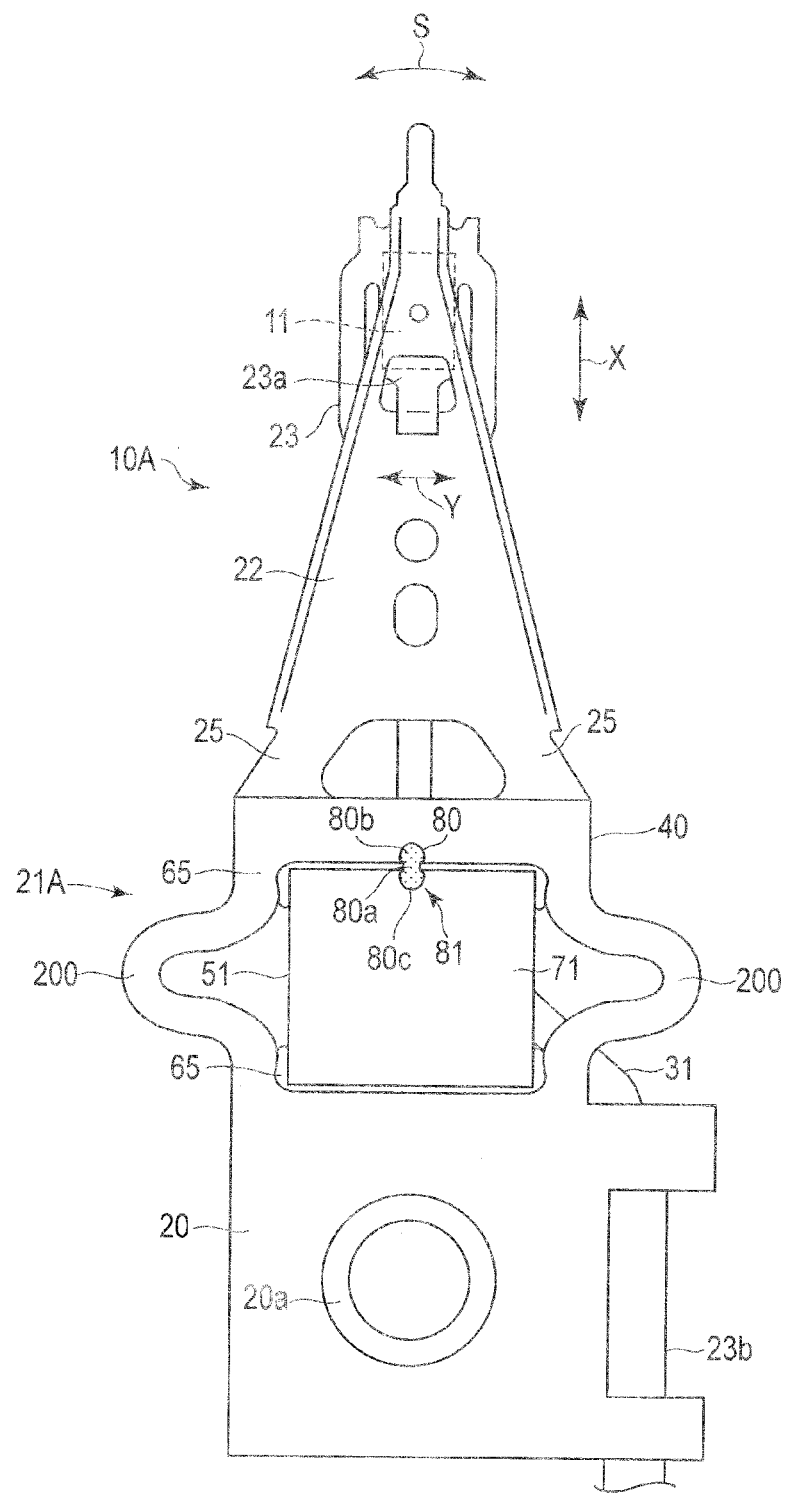
FIG. 10 is a plan view of a disk drive suspension according to a second embodiment.

FIG. 10 shows a suspension 10A according to a second embodiment. An actuator mounting section 21A of this suspension 10A comprises a single actuator element 51. A pair of U-shaped arm portions 200 are formed individually on opposite side portions of an electrically conductive plate 40. A first electrode 71 of actuator element 51, like that of the first embodiment, is electrically connected to the electrically conductive plate 40 on the ground side by an electrically conductive paste 80, such as silver paste. A second electrode (not shown) of actuator element 51, like that of the first embodiment, is connected to a conducting member 31 of a flexure 23 through a terminal area.

If a voltage is applied to actuator element 51 so that the actuator element is distorted, in the actuator mounting section 21A of this embodiment, one of the arm portions 200 contracts, and the other expands. Thereupon, a load beam 22 can be moved in a sway direction (indicated by arrow S in FIG. 10). Since other configurations and effects are common to the actuator mounting sections 21 and 21A of the first and second embodiments, common numbers are used to designate common portions of the first and second embodiments, and a description of those portions is omitted.

It is to be understood, in carrying out the present invention, that the specific forms of the constituent elements of the actuator mounting section, including the actuator elements, electrically conductive plate, resin bonding material, electrically conductive paste, etc., as well as of the disk drive suspension, may be modified variously. Also, the paste application device may be embodied in various modified forms.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An actuator mounting section of a disk drive suspension, comprising:
    an actuator element comprising an electrode;
    an electrically conductive plate comprising an opening which accommodates the actuator element;
    an electrically insulating resin bonding material which secures the actuator element to the electrically conductive plate; and
    an electrically conductive paste applied to a bridge junction configured to electrically connect the electrically conductive plate and the electrode,
    the electrically conductive paste of the bridge junction comprising
    a first portion formed on the resin bonding material between the electrode and the electrically conductive plate and having a paste height above the resin bonding material smaller than either of those above the electrically conductive plate and the electrode,
    a second portion formed on the electrically conductive plate and having a paste width on the electrically conductive plate greater than that of the first portion, and a third portion formed on the electrode and having a paste width on the electrode greater than that of the first portion.

2. The actuator mounting section of claim 1, wherein the resin bonding material consists mainly of an epoxy resin, and the electrically conductive paste is a silver paste comprising an organic resin binder and silver particles mixed in the binder.

3. A method of applying an electrically conductive paste to a bridge junction configured to electrically connect an electrode of an actuator element and an electrically conductive plate, in a disk drive suspension, the electrically conductive paste application method comprising:

accommodating the electrically conductive paste in a dispenser;

setting a pressure of air according to an elapsed time of use of the electrically conductive paste so that a paste height above the resin bonding material between the electrode and the electrically conductive plate is not less than a target height;

discharging the electrically conductive paste from the dispenser toward the bridge junction by means of the air pressure; and maintaining the target height of the electrically conductive paste by increasing the air pressure with increase of the elapsed time of use.

4. A paste application device for applying an electrically conductive paste to a bridge junction configured to electrically connect an electrode of an actuator element and an electrically conductive plate, in a disk drive suspension, the paste application device comprising:

a dispenser which discharges the electrically conductive paste toward the bridge junction by means of a pressure of air; and a control unit configured to control discharge of the electrically conductive paste, the control unit comprising means for obtaining information corresponding to an elapsed time of use of the electrically conductive paste in the dispenser, and means for setting the air pressure according to the elapsed time of use of the electrically conductive paste so that a paste height above the resin bonding material between the electrode and the electrically conductive plate is not less than a target height, discharging the electrically conductive paste from the dispenser toward the bridge junction by means of the air pressure, and maintaining the target height of the electrically conductive paste by increasing the air pressure with increase of the elapsed time of use.

* * * * *